United States Patent Office 3,210,438
Patented Oct. 5, 1965

3,210,438
METHOD FOR INCREASING POLYAMIDE
VISCOSITY
Richard D. Chapman, Durham, N.C., assignor, by mesne assignments, to Monsanto Company, a corporation of Delaware
No Drawing. Filed May 4, 1961, Ser. No. 107,639
12 Claims. (Cl. 260—857)

This invention relates to polymeric materials, and more particularly to synthetic linear polyamides having an increased viscosity.

The synthetic linear polyamides to which the description of this invention is addressed are of the general types as described in U.S. Patents 2,071,250, 2,071,253 and 2,130,948. They are commonly referred to by the generic term nylon and are characterized by the presence of recurring carbonamide groups as an integral part of the polymer chain, which groups are separated by at least two carbon atoms. They are further characterized by high melting point, pronounced crystallinity, and insolubility in most solvents except mineral acids, formic acids and the phenols. Upon hydrolysis with strong mineral acids, the polymers revert to the reactants from which they were formed.

The synthetic linear polyamides are of two general types, those which are obtained from the self-polymerization of amino acids such as 6-amino-caproic acid, 9-aminononanoic acid, 11-aminoundecanoic acid and their amide-forming derivatives, for example, epsilon-caprolactam; and those which are formed by the condensation of a diamine with a dibasic acid or an amide-forming derivative thereof. Diamines which can be condensed with equimolecular proportions of an appropriate dibasic acid to yield synthetic linear polyamides may be represented by the general formula $NH_2(CH_2)_nNH_2$ in which $n$ is an integer of 2 or greater and preferably from 2 to 8. Suitable examples are ethylenediamine, propylenediamine, tetramethylenediamine, pentamethylenediamine, hexamethylenediamine, octamethylenediamine and decamethylenediamine. Suitable dibasic acid reactants are represented by the general formula HOOCRCOOH in which R is a divalent hydrocarbon radical having a general length of at least two carbon atoms. Representative reactants of this type are sebacic acid, octadecanedioic acid, adipic acid, suberic acid, azelaic acid, undecanedioic acid, glutaric acid, pimelic acid, brassylic acid and tetradecanedioic acid. As has been indicated, the amide-forming derivatives thereof may be substituted for the diamine and dibasic acid reactants. Thus, the carbamate and N-formyl derivative may be used in lieu of the diamines, while the mono- and di-ester, the anhydride, the mono- and di-amide, and the acid halide may be substituted for the dibasic acid.

Although polyamides prepared by standard methods are very valuable and find a wide variety of uses, such as in the manufacture of fibers, bristles, films, coatings and the like; the maximum viscosities which can be attained by generally employed methods of polymer preparation are lower than desired for certain applications. For example, the melt viscosity of synthetic linear polyamides is too low for most effective use in injection molding processes.

There presently exists a number of completely satisfactory methods for producing polyamides of a reduced viscosity, e.g., employing an unbalance of end groups or by the controlled addition of mono-functional viscosity stabilizers. However, existing methods for accomplishing an increase over normal viscosities are either difficult to control or present serious processing difficulties. For example, it is known that viscosity can be increased by equilibration of the molten polymer under vacuum, but unfortunately this is difficult to accomplish in commercial practice. Other known methods for increasing polymer viscosity are by drying the polymer for extended periods of time at elevated temperatures in an inert atmosphere, or by the addition of trifunctional reactants, such as trimesic acid. These methods are either difficult to control in practice or cause serious gelation problems.

It is, therefore, a principal object of this invention to provide a satisfactory and convenient method for increasing the melt viscosity of synthetic linear polyamides.

It is a further object of this invention to increase the viscosity of polyamides in a uniform manner.

Other objects and advantages will become apparent as the following description of this invention proceeds.

It has now been found that the foregoing objects can be accomplished by adding a polycarbonate having a molecular weight in excess of 5,000 to the polyamide-forming reactants in an amount of from about 0.1 to 10 percent on the weight of the polyamide, preferably from 1 to 5 percent; the introduction being made after the condensation reaction has progressed to within at least 95 percent of completion.

It is essential that the additive be introduced into the polyamide-forming reaction mass only after the reaction has reached a point of at least 95 percent of completion, since it has been found that earlier additions do not result in an increase over normal polymer viscosity. This level of reaction can be easily ascertained in practice, for example, it may be determined by employing a standardized torque meter on the stirring mechanism generally used with conventional autoclaves. After the polyamide-forming reaction has reached 95 percent of completion, the additive agent may be introduced at any time thereafter. In fact, the addition can be effectively made to the melt of a pre-formed polyamide, for, as is well known, polymers of this type are capable of further reaction when heated in the molten state due to the presence of terminal amino and carboxyl groups. When this procedure is employed, the pre-formed polymer should have an intrinsic viscosity of 0.4 or better to assure that polymerization has proceeded to the 95 percent of completion level or greater.

The precise stage of reaction for the most effective addition of the modifying agent will depend upon the extent of viscosity increase desired. That is, greater viscosity increases are realized when the addition is made closer to the completion of the polyamide-forming reaction. The extent of viscosity increase desired will also determine the amount of and the molecular weight of the polycarbonate to be employed. As might be expected, the higher concentrations of additive and the greater molecular weights thereof have correspondingly greater influence upon realizable polymer viscosity. For most purposes, the results desired can be attained by employing a polycarbonate with a molecular weight in the range of from 10,000 to 80,000, and in an amount of from about 1 to 5 percent on the weight of the polyamide to be formed.

As is well known, the polycarbonates are linear polyesters of carbonic acid. Since the methods by which they are prepared are well understood in the art, it will merely be stated that they are prepared by the reaction of carbonic acid derivatives with dihydroxy compounds. Among suitable carbonic acid derivatives which may be employed are aliphatic diesters, such as diethyl-, dipropyl-, dibutyl-, diamyl-, dioctyl-, methylethyl-, ethylpropyl-; cycloaliphatic diesters, such as dicyclohexyl- and dicyclopentyl-carbonate; diarylesters, such as diphenyl- and ditolylcarbonate; and others, such as methylcyclohexyl-, ethylcyclohexyl-, methylphenyl-, ethylphenyl- and cyclohexylphenyl-carbonate.

Among aliphatic dihydroxy compounds which may be employed as reactants in forming polycarbonates, there may be mentioned diethylene glycol, triethylene glycol, polyethylene glycol, the di-glycols produced from propylene oxide-1,2, butane diol-1,4, hexane diol-1,6, octane diol-1,8 and decane diol-1,10. Suitable cycloaliphatic dihydroxy compounds are cyclohexane diol-1,4; 2,2-di-(p-hydroxycyclohexyl)-propane and 2,6-dihydroxy-decahydronaphthalene. Suitable aromatic dihydroxy compounds are hydroquinone, resorcinol, 4,4-dihydroxy-diphenyl, 1,4-dihydroxynaphthalene, 1,6-dihydroxynaphthalene, 2,6-dihydroxynapthalene, 1,5-dihydroxyanthracene and m,p-hydroxybenzyl alcohol. Mixtures of these dihydroxy compounds may also be employed.

Any of the above reactants may be employed in preparing polycarbonates suitable for the purposes of this invention inasmuch as the general class of these polymers may be used to advantage without restriction, save that of molecular weight, which should be in excess of 5,000.

In preparing the polyamides having an increased viscosity, it is not necessary to depart from the standard procedures employed in the preparation of conventional synthetic linear polyamides. That is, the polyamide-forming reactants are heated in the absence of oxygen to temperatures in the range of from 180° C. to 300° C., and preferably from 200° C. to 295° C. The reaction may be conducted at super-atmospheric, atmospheric or sub-atmospheric pressure, with reduced pressures generally being applied in the last stage of reaction to facilitate the removal of volatile by-products.

In order to illustrate the invention with greater particularity, a description follows of specific polyamide preparations starting with a preparation of standard polyhexamethylene adipamide. This is contrasted with the preparation of the polymer when the practice of this invention is employed. It is to be understood that the examples of polymer preparations which follow the instant invention are by way of illustration only and are not intended to be limitative. Parts are given by weight unless otherwise indicated.

*Example I*

A standard synthetic linear polyamide was prepared by charging an aqueous solution containing 50 percent by weight of hexamethylene diammonium adipate to an evaporator positioned immediately above an autoclave and equipped with means for dropping the contents thereof into the autoclave when desired. The aqueous salt solution was slowly heated at 13 p.s.i.g. until a temperature of 137° C. was reached and sufficient evaporation had occurred to provide a solution having a 75 percent concentration of nylon salt. This solution was then dropped into the autoclave which was heated in a closed system until a temperature of about 220° C. and a pressure of 250 p.s.i.g. had been obtained. At this stage the bleeding off of water vapor was begun. The polymerization cycle was then continued by increasing the autoclave temperature to a value of 243° C. while the pressure was held constant. At this point the pressure reduction cycle began with the pressure being reduced to atmospheric over a period of 25 minutes while the temperature was increased to 275° C. where it was held for 30 minutes. Upon completion of the reaction the molten polymer was extruded through an orifice in the autoclave, after which it was quenched and cut into chips or flakes suitable for remelting at the grid of a spinning assembly.

*Example II*

A batch of polymer was prepared following the technique of Example I with the exception that 1 percent on the weight of the polymer of 2,2-bis(4-hydroxyphenyl) propane polycarbonate having a molecular weight of about 30,000 was added to the autoclave prior to the introduction thereto of the concentrated hexamethylene diammonium adipate solution. Following completion of the reaction to form the synthetic linear polyamide, the molten polymer was extruded from the autoclave, quenched and cut into chips as in Example I. As is apparent, the requirement for introducing the polycarbonate after the polyamide-forming reaction had reached 95 percent of completion was departed from in this preparation.

*Example III*

400 parts of an aqueous solution containing 50 percent by weight of hexamethylene diammonium adipate was charged to an evaporator positioned immediately above an autoclave and equipped for dropping the contents thereof into the autoclave when desired. The aqueous salt solution was slowly heated at 13 p.s.i.g. until a temperature of 137° C. was reached and sufficient evaporation had occurred to provide a solution having a 75 percent solute concentration. This product was then dropped into the autoclave which was heated in a closed system until a temperature of about 220° C. and a pressure of 250 p.s.i.g. had been attained. At this stage bleeding off of water vapor was begun. The polymerization cycle was then continued by increasing the autoclave temperature to a value of about 243° C. while the pressure was held constant. The pressure was then reduced to atmospheric over a period of 25 minutes while the temperature was increased to 175° C. At this point there was added to the autoclave 1 percent on the weight of the polymer to be formed of 2,2-bis(4-hydroxyphenyl) propane polycarbonate having a molecular weight of about 30,000. The autoclave temperature of 275° C. was maintained for 30 minutes following the addition of the polycarbonate additive. Upon completion of the reaction the molten polymer formed was extruded through an orifice in the autoclave, after which it was quenched and cut into flakes.

*Example IV*

A batch of polymer was prepared in a manner identical to that employed in Example III except that the said polycarbonate was introduced into the autoclave in an amount constituting 2 percent on the weight of the polymer to be formed.

*Example V*

A polymer was prepared following the procedure of Example III exactly except that the said polycarbonate was introduced into the autoclave in an amount of 3 percent on the weight of the polymer to be formed.

*Example VI*

To the polyhexamethylene adipamide flake obtained in Example I (i.e., a standard synthetic linear polyamide) there was added 2,2-bis(4-hydroxyphenyl)propane polycarbonate having a molecular weight of about 30,000 in an amount of 2 percent on the weight of the polymer. This mixture was then heated until the molten state was attained and the temperature was permitted to rise to 280° C. where it was maintained for 30 minutes while stirring the melt. The resulting molten polymer was then extruded into a rod which was cut into chips.

*Example VII*

An aqueous solution containing 50 percent by weight of hexamethylene diammonium adipate was charged to an evaporator positioned immediately above an autoclave and equipped for dropping the contents thereof into the autoclave when desired. The aqueous salt solution was slowly heated at 13 p.s.i.g. until a temperature of 137° C. was reached and sufficient evaporation had occurred to provide a solution having a 75 percent concentration of the solute. This solution was then dropped into the autoclave which was heated in a closed system until a temperature of about 220° C. and a pressure of 250 p.s.i.g. had been attained. At this stage bleeding off of water vapor was begun. The polymerization cycle was then continued by increasing the autoclave temperature to a value of about 243° C. while the pressure was held constant. The pressure was then reduced to atmospheric over a period of 25 minutes while the temperature was increased to 275° C. At this point there was added to the autoclave 1 percent by weight on the polymer to be formed of a resorcinol polycarbonate having a molecular weight in excess of 20,000. The autoclave temperature of 275° C. was maintained for 30 minutes following the addition of the polycarbonate additive. Upon completion of the reaction the molten polymer formed was extruded through an orifice in the autoclave, after which it was quenched and cut into flake.

On polymer samples taken from each of the above examples, comparative relative viscosity measurements were taken. These measurements were determined in the conventional manner by employing an Ostwald viscometer at 25° C. A solution of the polyamide is prepared in 90 percent formic acid having a concentration of 11 grams per 100 cc. solvent. The time required for a given volume of this solution to pass through the viscometer divided by the time required to pass an equal volume of solvent through the viscometer is taken as the relative viscosity of the polymer. The results are tabulated in the following table.

| Example | Polycarbonate added percent on polymer weight | Polymer relative viscosity |
| --- | --- | --- |
| I (control) | 0 | 44 |
| II | 1 | 43 |
| III | 1 | 60 |
| IV | 2 | 79 |
| V | 3 | 155 |
| VI | 2 | 92 |
| VII | 1 | 56 |

It is clearly seen from the results presented in the above table that relative viscosity was substantially increased over the control (polyamide prepared by standard method) in all instancts except that of Example II. It was in this example that the polycarbonate modifying agent was added prior to the attainment of substantial reaction between the polyamide-forming reactants, i.e., at least 95 percent of completion.

A series of polyamide polymers were prepared from caprolactam and also tested for comparative relative viscosity in accordance with the method set out above.

*Example VIII*

This example illustrates the preparation of a standard polycaprolactam. A quantity of 60 parts of caprolactam and 25 parts of water were charged to a stirred autoclave. After air was removed from the system by means of a nitrogen purge, the pressure and temperature was raised over a period of 50 minutes to values of 250 p.s.i.g. and 250° C., respectively. At this point, the autoclave pressure was reduced at the rate of 25 p.s.i.g. every 9 minutes until atmospheric pressure was reached, during which time water was removed from the polymer as condensate. The pressure was then further reduced over a period of approximately 35 minutes to a value of 100 mm. of mercury where it was held for aproximately 18 minutes. The polymerization was completed by bringing the pressure back to atmospheric. The molten polymer obtained was extruded, quenched and cut into flakes.

*Example IX*

To the polycaprolactam flake obtained in Example VIII (i.e., a standard polycaprolactam polymer) there was added 2,2 - bis(4 - hydroxyphenyl)propane polycarbonate having a molecular weight of 30,000 in an amount of 2 percent on the weight of the polymer. This mixture was then heated until the molten state was attained and the temperature was permitted to rise 280° C. where it was maintained for 30 minutes while stirring the melt. The resulting molten polymer was then extruded into a rod which was cut into chips.

*Example X*

To the polycaprolactam flake obtained in Example VIII (i.e., a standard polycaprolactam polymer) there was added 2,2-bis(4 - hydroxyphenyl)propane polycarbonate having a molecular weight of about 10,000 in an amount of 2 percent on the weight of the polymer. This mixture was then heated until the molten state was attained and the temperature was permitted to rise 280° C. where it was maintained for 30 minutes while stirring the melt. The resulting polymer was then extruded into a rod which was cut into small flake-like particles.

The relative viscosity measurements for the preceding examples of polycaprolactam preparations are given in the following table.

| Example | Polycarbonate added percent on polymer weight | Polymer relative viscosity |
| --- | --- | --- |
| VIII | 0 | 49 |
| IX | 2 (mol. wt. 30,000) | 168 |
| X | 2 (mol. wt. 10,000) | 66 |

It is demonstrated in the above test data, that when a polycarbonate of a higher molecular weight is employed, the polymer viscosity increases are substantially greater than is the case when polycarbonates of lower molecular weight are used.

As previously noted, the products obtained in the practice of this invention are particularly useful in injection molding processes where polyamides having a high viscosity are especially desired. However, they may also be used to advantage in the manufacture of fibers, bristles, films and the like where the ultimate end-use intended would be benefited by the employment of a polymer having an increased viscosity.

As many different embodiments would readily occur to those skilled in polymer chemistry, it is to be understood that the specific embodiments of the invention as presented herein are not to be construed as limiting, but that the limitations are to be determined only from the appended claims.

I claim:

1. A process for increasing the viscosity of synthetic linear polyamides which comprises subjecting polyamide-forming reactants which are capable of forming polyamides having recurring carbonamide groups as an integral part of the polymer chain, which groups are separated by at least two carbon atoms to a condensation reaction by heat treatment at a temperature in the range of from 180° C. to 300° C.; permitting the reaction to reach at least 95 percent of completion, and thereafter reacting said reaction mass having an intrinsic viscosity of at least 0.4 in the molten state and having terminal unreacted amino and carboxyl groups, with a polycarbonate having a molecular weight in excess of 5,000 and in an amount of from 0.1 to 10 percent based on the weight of the polyamide to be formed.

2. The process of claim 1 wherein said polycarbonate is 2,2-bis(4-hydroxyphenyl)propane polycarbonate.

3. The process of claim 1 wherein said polycarbonate is a resorcinol polycarbonate.

4. The process of claim 1 wherein said polyamide-forming reactant is hexamethylene diammonium adipate.

5. The process of claim 1 wherein said polyamide-forming reactant is caprolactam.

6. A process for increasing the viscosity of synthetic linear polyamides which comprises subjecting polyamide-forming reactants which are capable of forming polyamides having recurring carbonamide groups as an integral part of the polymer chain, which groups are separated by at least two carbon atoms to a condensation reaction by heat treatment at a temperature in the range of from 180° C. to 300° C.; permitting the reaction to reach at least 95 percent of completion, and thereafter reacting said reaction mass having an intrinsic viscosity of at least 0.4 in the molten state and having terminal unreacted amino and carboxyl groups, with a polycarbonate having a molecular weight of from 10,000 to 80,000 and in an amount of from 1 to 5 percent based on the weight of the polyamide to be formed.

7. A process for increasing the viscosity of synthetic linear polyamides having recurring carbonamide groups as an integral part of the polymer chain, which groups are separated by at least two carbon atoms, said process comprising reacting a pre-formed synthetic linear polyamide of the aforesaid type having an intrinsic viscosity of at least 0.4 in the molten state and having terminal unreacted amino and carboxyl groups, with a polycarbonate having a molecular weight in excess of 5,000, said polycarbonate being present in an amount of from 0.1 to 10 percent based on the weight of the pre-formed synthetic linear polyamide.

8. The process of claim 7 wherein said pre-formed synthetic linear polyamide is polyhexamethylene adipamide.

9. The process of claim 7 wherein said pre-formed synthetic linear polyamide is polycaprolactam.

10. The process of claim 7 wherein said polycarbonate is 2,2-bis(4-hydroxyphenyl)propane polycarbonate.

11. The process of claim 7 wherein said polycarbonate is resorcinol polycarbonate.

12. A process for increasing the viscosity of synthetic linear polyamides having recurring carbonamide groups as an integral part of the polymer chain, which groups are separated by at least two carbon atoms, said process comprising reacting a pre-formed synthetic linear polyamide of the aforesaid type having an intrinsic viscosity of at least 0.4 in the molten state and having terminal unreacted amino and carboxyl groups, with a polycarbonate having a molecular weight in the range of from 10,000 to 80,000, said polycarbonate being present in an amount of from 1 to 5 percent based on the weight of the pre-formed synthetic linear polyamide.

References Cited by the Examiner
UNITED STATES PATENTS

| | | | |
|---|---|---|---|
| 2,789,970 | 4/57 | Reynolds et al. | 260—873 |
| 2,789,971 | 4/57 | Reynolds et al. | 260—858 |
| 2,843,567 | 7/58 | Williams et al. | 260—463 |

MURRAY TILLMAN, *Primary Examiner.*

LEON J. BERCOVITZ, *Examiner.*